(12) United States Patent
Fagans

(10) Patent No.: US 8,237,712 B2
(45) Date of Patent: Aug. 7, 2012

(54) MANIPULATION OF IMAGE CONTENT USING VARIOUS IMAGE REPRESENTATIONS

(75) Inventor: Joshua Fagans, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 1294 days.

(21) Appl. No.: 10/803,315

(22) Filed: Mar. 18, 2004

(65) Prior Publication Data

US 2005/0206658 A1   Sep. 22, 2005

(51) Int. Cl.
G06T 17/00 (2006.01)
G06F 3/048 (2006.01)
G06F 3/00 (2006.01)

(52) U.S. Cl. .................. 345/428; 715/764; 715/866

(58) Field of Classification Search .............. 715/764; 345/428

See application file for complete search history.

(56) References Cited

U.S. PATENT DOCUMENTS

| | | | |
|---|---|---|---|
| 5,142,616 A * | 8/1992 | Kellas et al. ............... 345/634 |
| 5,519,439 A * | 5/1996 | Keith ....................... 375/240.01 |
| 5,602,564 A * | 2/1997 | Iwamura et al. ........... 715/782 |
| 5,692,117 A * | 11/1997 | Berend et al. .............. 345/475 |
| 5,862,252 A * | 1/1999 | Yamamoto et al. ........ 382/154 |
| 5,991,783 A * | 11/1999 | Popa et al. ................ 715/209 |
| 6,031,569 A * | 2/2000 | Nobuoka et al. .......... 348/220.1 |
| 6,058,417 A * | 5/2000 | Hess et al. ................ 709/219 |
| 6,147,703 A * | 11/2000 | Miller et al. .............. 348/220.1 |
| 6,212,301 B1 * | 4/2001 | Warner et al. ............ 382/232 |
| 6,215,523 B1 * | 4/2001 | Anderson ............. 348/333.05 |
| 6,452,579 B1 * | 9/2002 | Itoh et al. ................. 345/100 |
| 6,597,471 B1 * | 7/2003 | Yoshikawa ................ 358/1.2 |
| 6,608,628 B1 * | 8/2003 | Ross et al. ................ 345/619 |
| 6,650,343 B1 * | 11/2003 | Fujita et al. .............. 715/760 |
| 6,833,848 B1 * | 12/2004 | Wolff et al. ............... 715/719 |
| 6,976,229 B1 * | 12/2005 | Balabanovic et al. ...... 715/838 |
| 7,062,107 B1 * | 6/2006 | Crosby et al. ............. 382/299 |
| 2002/0000998 A1 * | 1/2002 | Scott et al. ............... 345/667 |
| 2002/0042750 A1 * | 4/2002 | Morrison ................. 705/26 |
| 2003/0095155 A1 * | 5/2003 | Johnson ................... 345/864 |
| 2004/0125400 A1 * | 7/2004 | De Graaff et al. ........ 358/1.15 |

FOREIGN PATENT DOCUMENTS

JP  11161158 A  * 6/1999

* cited by examiner

*Primary Examiner* — Ryan Pitaro
*Assistant Examiner* — Stephen Alvesteffer
(74) *Attorney, Agent, or Firm* — Wong, Cabello, Lutsch, Rutherford & Brucculeri, L.L.P.

(57) ABSTRACT

Disclosed herein are embodiments of systems and methods for displaying and updating image previews in the graphical user interface of an application program running on a computer. The image previews for a given master image within the application program constitute various image sizes and resolution of that master image, and are preferably compiled as image preview data sets in a database accessible by the application program. When the image previews are manipulated in the applications program by a user, for example by scrolling or magnifying them, an appropriate resolution for that image preview can be queried from the database and displayed. For example, while scrolling, a lower-resolution image preview data set might be used when compared to those image preview data sets used while the image previews are not scrolled, thus making them less computationally intensive to display and update. Likewise, while magnifying, an appropriate image preview data set can be queried from the database instead of, or in conjunction with, up- or downscaling the image preview.

42 Claims, 11 Drawing Sheets

MANIPULATION OF IMAGE CONTENT USING VARIOUS IMAGE REPRESENTATIONS

FIELD OF THE INVENTION

Embodiments of the present invention relate to systems and methods for displaying image previews in the graphical user interface of an application program running on a computer, and particularly to schemes for allowing for improved scrolling and magnification of such images.

BACKGROUND

FIG. 1A shows a representation of a graphical user interface (GUI) 10 for an application program (iPhoto™) displayable on a computer screen for viewing a plurality of previews 14 of image files (shown as images 1$a$, 1$b$, etc.) in a catalog window 16. Such image previews 14 are sometimes referred to as "thumbnails," and may be derived from compressed JPEG image files for example. Such image previews 14 can constitute logical groupings within the application (such as in an album 17), which may or may not correspond to a file system directory. In any event, by viewing the image previews 14, the user can choose an image preview of interest—for example, by "clicking" on it with a mouse pointer 18—which may then display its corresponding master image fully on the screen, allow the user to edit that image, etc. The displayed GUI 10 is similar to that found in the iPhoto™ software product available from Apple Computer, Inc. of Cupertino Calif., which is incorporated herein by reference.

The image previews 14 constitute graphically smaller versions of the master image files that they represent. For example, suppose a master image, such as one loaded into the computer from a digital camera, comprises a compressed JPEG image. Such master images typically comprise a large number of pixels compared to the image previews 14. For example, the master image may comprise a picture with over 1 million pixels (even when compressed), while the image previews 14 may constitute a smaller representation (e.g., 240 by 180 pixels) of the master image to which it corresponds. Such image previews 14 can be generated when a master image is loaded into the computer (e.g., using iPhoto) and/or when it is incorporated into the album 17, a file directory, or other logical grouping, which may occur using file management tool or by simply dragging images of interest in the catalog window 16. Once generated, the image previews 14 are stored as associated with their corresponding master image, and the image previews are displayed within the catalog window 16 as shown.

FIG. 1A shows a couple of different ways in which the image previews 14 may be manipulated within the catalog window 16. First, and assuming that the image preview 14 are too numerous to display with the expanse of the catalog window 16, the catalog window 16 may be associated with a scroll bar 20 having a scroll bar button 21, which can be manipulated using the mouse pointer 18 to scroll up and down (or left to right) amongst the image previews 14 to display image previews of interest. Second, the magnification of the image previews can be manipulated through use of a zoom selector slide 22 controllable by a zoom selector button 23 which is again is moveable using the mouse pointer 18. When button 23 is at its left-most position, the image previews 14 are shown within the catalog window 16 in their smallest format. When slid to the right, and as shown in FIG. 1B, the image previews 14 are magnified, and consequently a smaller number of image previews 14 are displayed within the catalog window 16. FIG. 1A shows the relative numbers of image previews that are displayed in the catalog window 16 when button 23 is moved to position 23$a$ (16$a$; sixteen image previews) and position 23$b$ (16$b$; four image previews). Of course, these numbers are merely exemplary and can constitute hundreds of image previews in an actual implementation.

Regardless of how the image previews 14 are being manipulated, ultimately such manipulation requires processing of the data that comprises the image preview, which as mentioned earlier can constitute a data set of the size of 240 by 180 pixels. This data set size for the image previews 14 is relatively large to provide suitable functionality within the program provided by GUI 10. For example, suppose the user slides button 23 to its right-most extent (not shown) to display the image previews 14 (or perhaps even a single image preview 14) at a high magnification. Were the data set size of the image previews 14 too small (or, said another way, at too low of a resolution), the image preview 14 would look unnatural or pixelated when magnified.

However, having such relatively large data sets for the image previews 14 also causes performance problems. For example, suppose the user wishes to scroll downward (using scroll bar 20) to view image previews 14 towards the bottom and presently unviewable within the catalog window 16. The image previews 14 should proceed seamlessly upwards within the catalog window 16 during scrolling. But to do this, the computer must process the relatively large amounts of data that comprise the various image previews 14 appearing within the catalog window 16. This problem is exacerbated as more image previews 14 are included within the catalog window 16, as would be the case when the image previews are displayed at low magnification. As a result, scrolling can appear disjointed and unsmooth to the user as the computer struggles to keep track all of the data sets of the affected image previews 14. For example, the rows of image previews 14 coming into view can appear to flicker, and/or scrolling can appear to the user to pause or "hang."

This same computation problem can also occur to a lesser extent when the zoom selector slide 22 is used to magnify or demagnify the displayed image previews. In this situation too, the relatively large sizes for the data sets for the image previews 14 can make zooming the image previews difficult. As well as having to handle relatively large amounts of data, adjustments must be made to the data sets for the image previews 14 on the fly as their zoom level is changed. Thus, pixels in the data sets may need to be interpolated to make smaller representations of the image previews 14, or data pixels may need to be interpolated to fill in portions of the image previews to allow them to be displayed in a larger size. This can be computationally intensive just as is scrolling.

Accordingly, the art would be benefited by a solution to these problems, and solutions are provided herein.

SUMMARY

Disclosed herein are embodiments of systems and methods for displaying and updating image previews in the graphical user interface of an application program running on a computer. The image previews for a given master image within the application program constitute various image sizes and resolution of that master image, and are preferably compiled as image preview data sets in a database accessible by the application program. The image preview data sets may be compressed or uncompressed, and may be memory-map formatted to facilitate their display. When the image previews are manipulated in the applications program by a user, for example by scrolling or magnifying them, an appropriate resolution for that image preview can be queried from the database and displayed. For example, while scrolling, a lower-resolution image preview data set might be used when compared to those image preview data sets used while the image previews are not scrolled, thus making them less computationally intensive to display and update. Likewise, while magnifying, an appropriate image preview data set can be queried from the database instead of, or in conjunction with, up- or downscaling the image preview. The disclosed techniques can also be used with respect to the dynamic display of images, or even a single image.

DETAILED DESCRIPTION

As noted, in the prior art, master images were pre-processed to form image previews 14. Specifically, the master image was pre-processed to form a single image preview data set—a single smaller graphical representation of the master image, and typically a 240 by 180 pixel-size compressed JPEG image. By contrast, the present disclosure pre-processes a given master image to form numerous image preview data sets for that image, each differing in its resolution. By doing this, the appropriate resolution for the image previews can be used by the computer in response to the user's manipulation (scrolling, magnification) of the image previews.

Figure 1A:
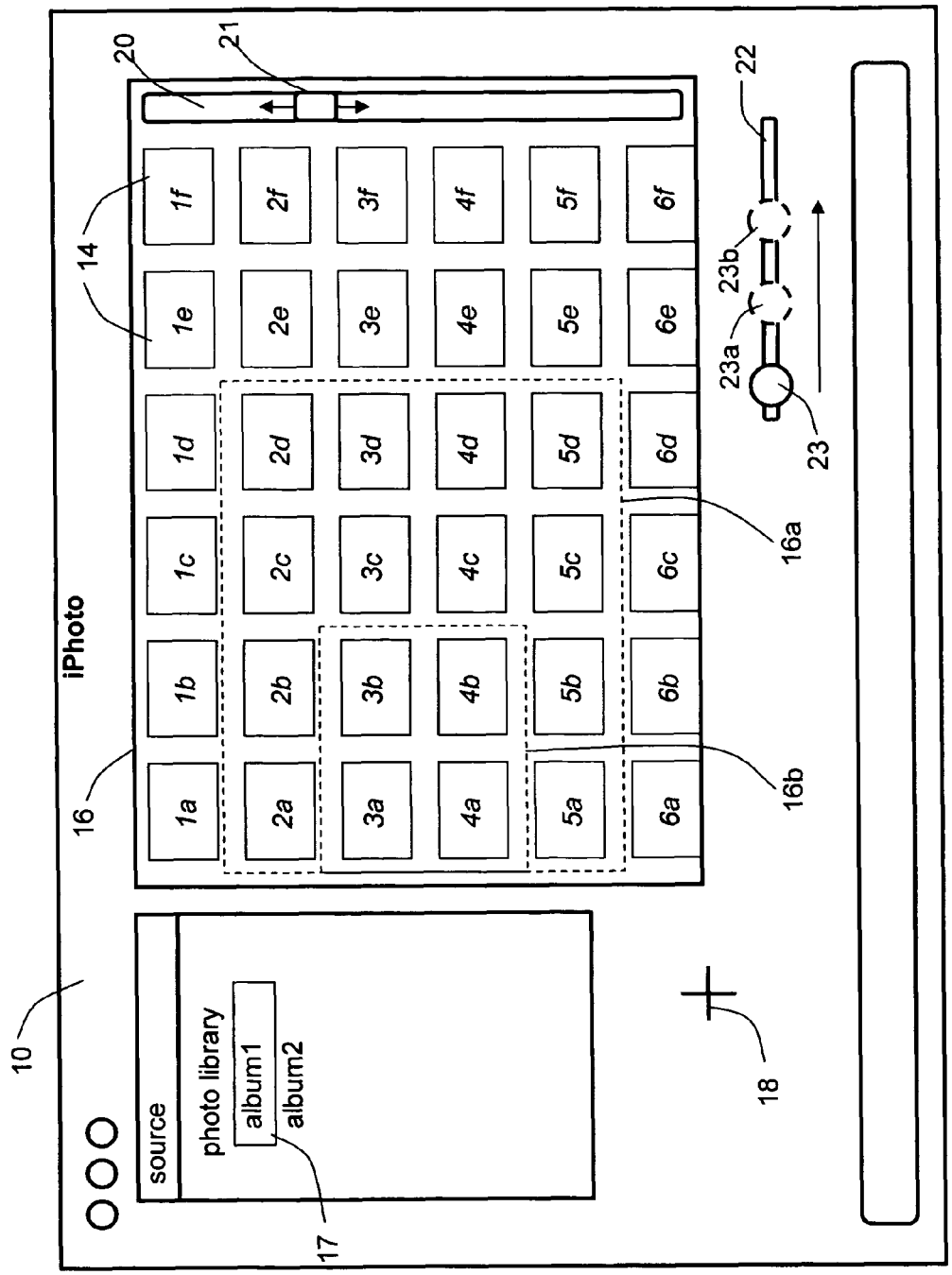
FIGS. 1A and 1B illustrate a graphical user interface (GUI) of the prior art used to view, scroll through, and magnify image previews of master images files within an album.
Figure 1B:
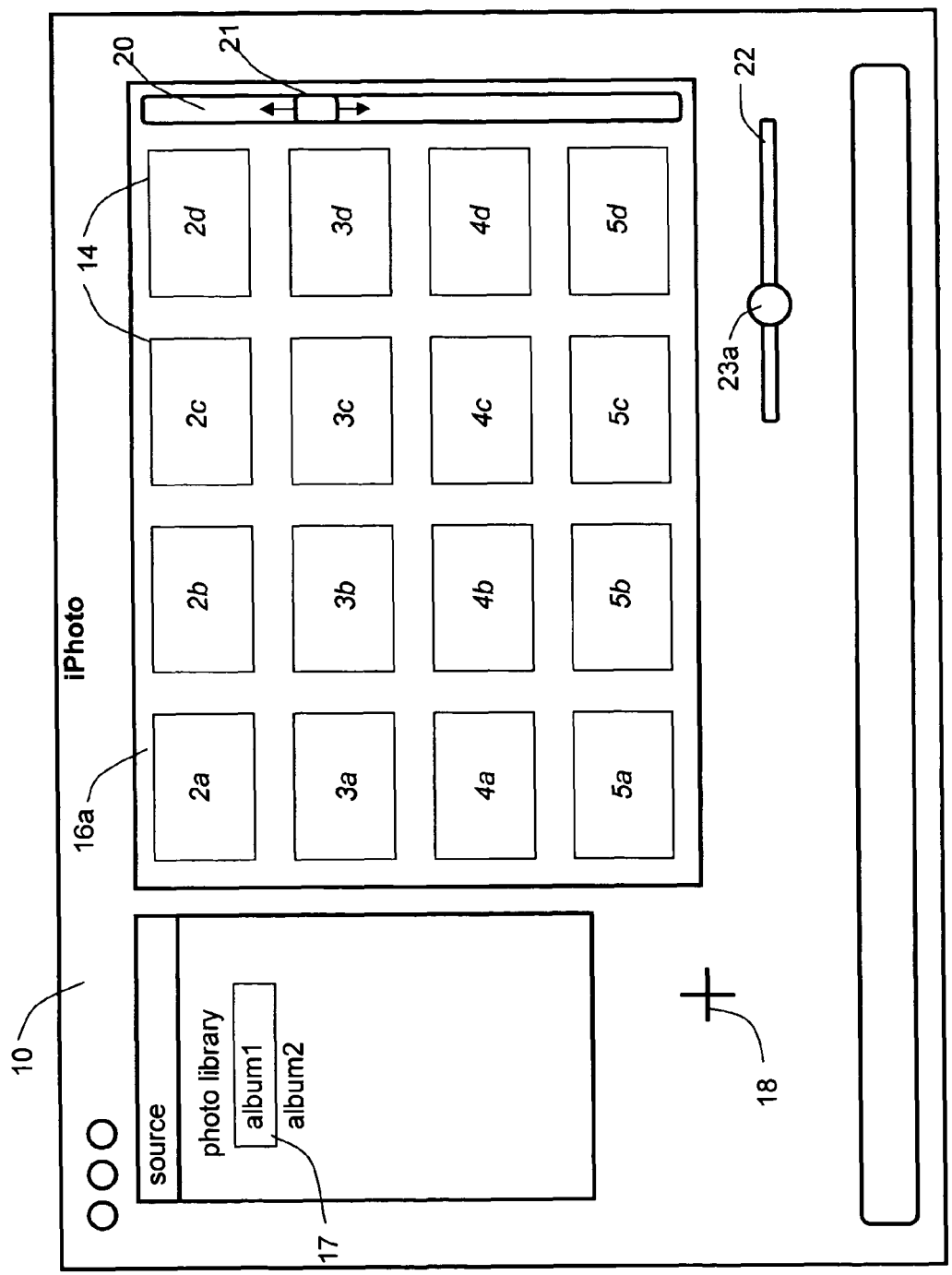
Figure 2:
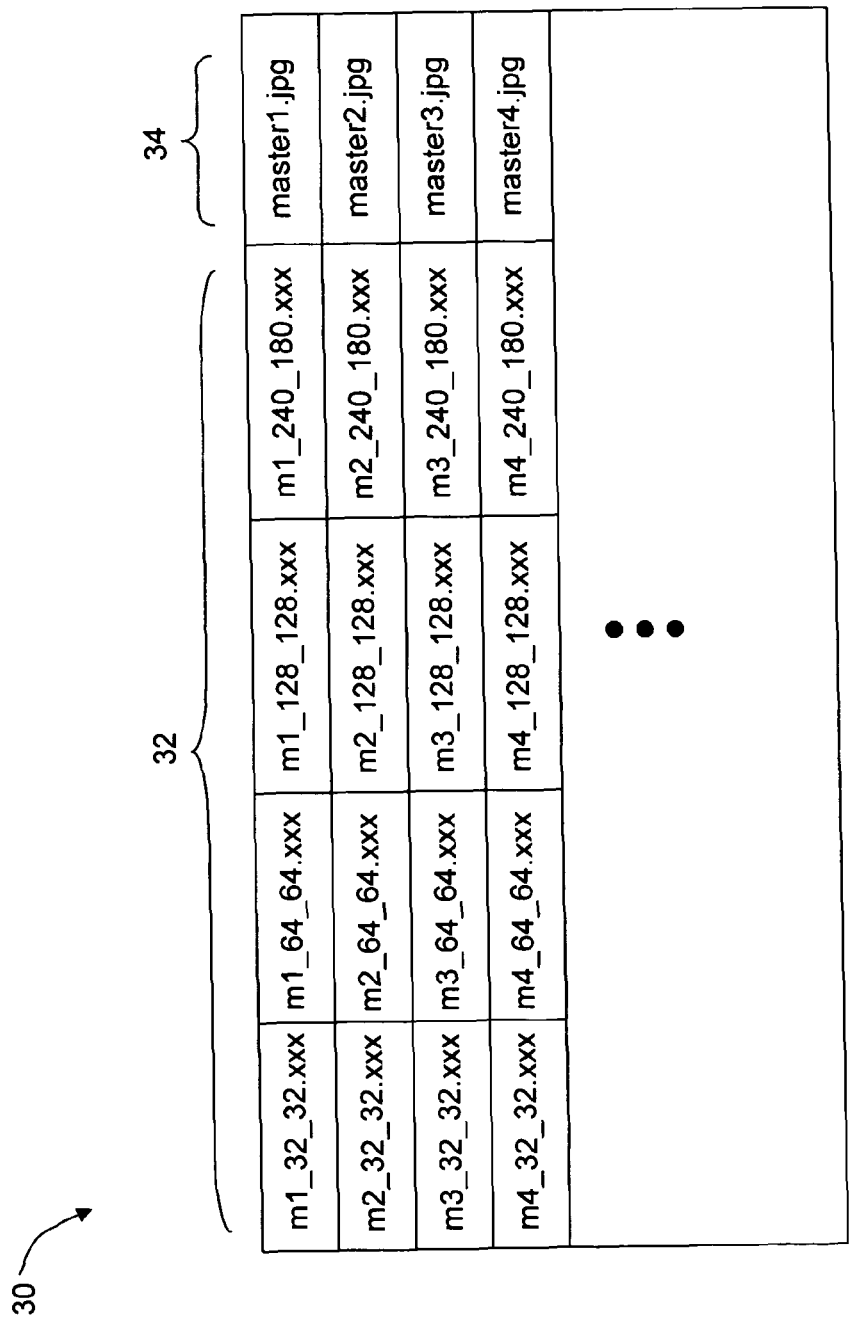
FIG. 2 illustrates a database in which master image files are pre-processed to form various image preview data sets of differing resolutions for each master image file.

FIG. 2 shows pre-processing of the master images 34 to from a database 30 of image preview data sets or files 32 displayable as the image previews 14. Specifically, each master image data file 34 (e.g., master1.jpg) is pre-processed to form a plurality of image preview data sets 32 of differing resolutions. For example, master file "master1.jpg," has been pre-processed to form a 32 by 32 pixels representation of the master file ("m1_32_32.xxx"), a 64 by 64 pixel representation ("m1_64_64.xxx"), a 128 by 128 pixel representation ("m1_128_128"), and a 240 by 180 pixel representation (m1_240_180.xxx). Such pre-processing can involve interpolating the pixels within the master image to form a new, smaller subset of pixels that constitute the image preview data sets 32, as is known.

While such pre-processing and population of the database 30 itself requires computation and the use of computer resources, it should be noted that such computation preferably occurs at a time prior to high bandwidth processing of the image previews 14, i.e., prior to magnification and scrolling of the image previews. As noted earlier, typically, pre-processing occurs as the master images 34 are loaded into the application program (iPhoto™) or otherwise associated with it in some fashion. Accordingly, such pre-processing and population of the database 30 does not appreciably affect computer performance. Pre-processing of the master images will typically also include stripping any unnecessary header information from the image preview data sets 32 (but not from the master image files 34 which preferably remain in tact).

Because of its size, database 30 is preferably stored on the computer's magnetic hard drive as opposed to in quicker RAM memory, although storage of at least some portion of the database 30 in RAM memory is also possible.

The various image preview data sets 32 can be formulated in a number of ways. For example, the image preview data sets 32 can be contained in memory-mapped files, which, as one skilled in the art understand, utilize pointers to point to the various data sets 32 on the hard drive so that they can be loaded into RAM memory quickly and subsequently processed by the graphics layer in the computer at issue. In a preferred embodiment, the 32 by 32, 64 by 64, and 128 by 128 data sets 32 are memory mapped. The 240 by 180 data sets 32 could also be memory mapped, but are preferably not so that they may be used in other application programs running on the computer.

The image preview data sets 32 can also vary in their data formats. In a preferred embodiment, the 32 by 32 and 64 by 64 data set 32 are uncompressed files, and further preferably are stored in an "ARGB" format immediately recognizable by the graphics layer without the need for substantial conversion. This is beneficial because when these smaller resolution image preview data sets 32 are used, the catalog window 16 will typically be displaying image previews 14 at a relatively low magnification level, and as a result, many image previews 14 may be displayed each requiring processing. By allowing these data sets 32 to be directly loaded into the graphics layer without decompression, the amount of required processing is reduced when these data sets are being used. By contrast, the 128 by 128 and 240 by 180 data sets 32 are preferably compressed JPEG files. When these higher resolution data sets 32 are used, they must first be decompressed before presentation to the graphics layer. However, because such data sets 32 are typically used with lesser amounts of displayed image previews (i.e., at higher magnifications), experience teaches that the additional processing required for decompression will not affect performance or create a bottle neck in the display of the image previews. Of course, in other implementations, different formats could be used: all of the data sets could be JPEGs or other forms of compressed files, or all could be uncompressed. Experimentation may be required to determine the suitable characteristics of the image preview data sets 32 for a given application, in light of computer and graphics processing speed, memory constraints, etc.

Although it is preferred to populate the pre-processed image preview data sets 32 within a database 30, this is not strictly required, as the sets 32 can constitute files arranged in an appropriate hierarchy. Moreover, while the master image files 34 can constitute a portion of the database 30, this is not necessary so long as some linking or pointing mechanism is used to associate a given master image data with its image preview data sets 32. "Database" as used herein should be understood broadly as encompassing all of these techniques and functional equivalents.

Figure 3A:
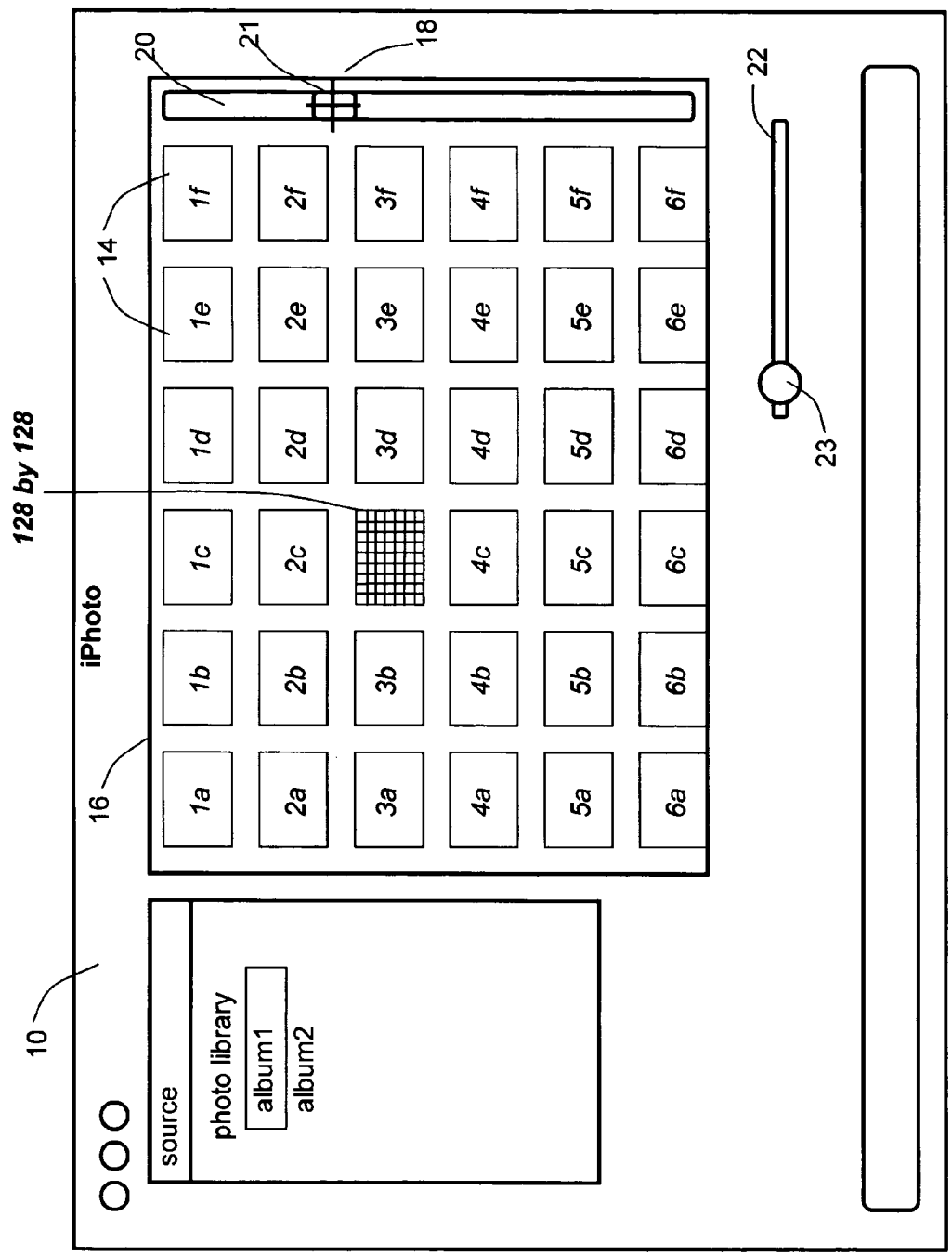
FIGS. 3A-3C illustrate the GUI employing the database of FIG. 2, and shows scrolling of the image previews and the use of lower resolution image preview data sets while scrolling.

Once master images have been pre-processed and the image database 30 populated, various image preview data sets 32 can be used at differing times to display image previews 14 in a manner appropriate for the action that the user is taking (e.g., scrolling or magnifying) to remedy the problems associated with the prior art explained earlier. For example, consider FIG. 3A, in which the user desires to scroll through the image previews 14 that are displayed. In FIG. 3A, the view is static because the user has not yet dragged the button 21 on the scroll bar 21. Accordingly, the image previews 14 can be displayed in some relatively high resolution format, such as 128×128 for illustrative purposes. (In a preferred embodiment, the displayed resolution might be 240 by 180). Such relatively high resolution is illustrated in image preview 3c, which shows a relatively high density of pixels in that image preview 14.

Figure 3B:
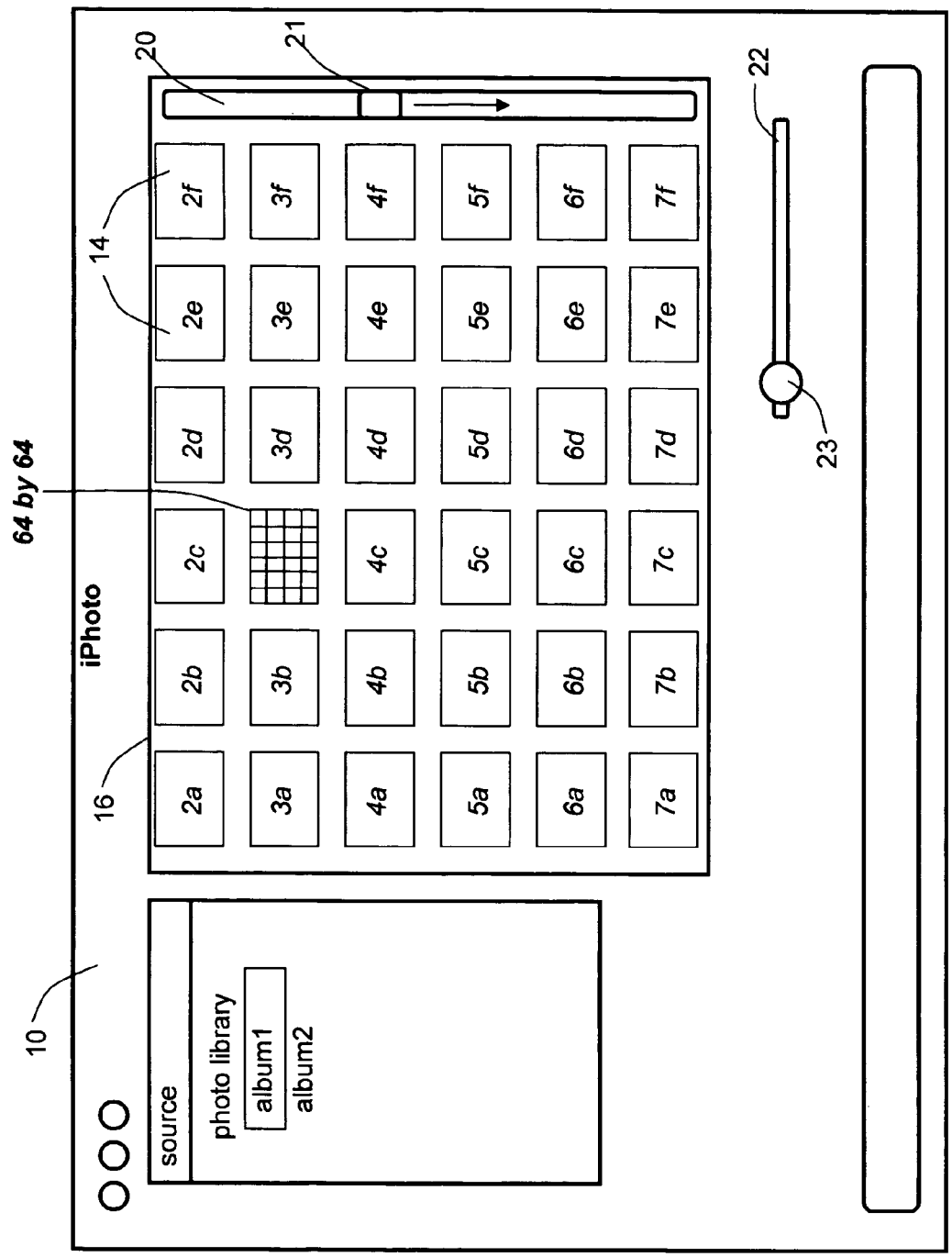

When the user drags the button 21 downward to display further rows of image previews 14 currently not seen (FIG. 3B), the computer may understand that high bandwidth processing must take place (particularly if the image previews are displayed at relatively low magnification). Accordingly, upon engagement of the scroll bar 20, the computer updates the image previews 14 by querying the database 30 to display them in a lower resolution format, which may be the next-lowest resolution in database 30—i.e., 64 by 64. This reduction in resolution is again illustrated with respect to image preview 3c, which, when compared to FIG. 3A, shows a reduced number of pixels indicative of the change of the resolution. In a preferred embodiment, all image previews 14 currently displayed in the catalog window 16 are re-displayed in such a lower resolution format during the scroll, although in other embodiments perhaps only certain subsets of the image previews 14 may be affected (e.g., those currently coming into view, such as image previews 7a-7f, or those moving out of view, such as image previews 1a-1f).

Figure 3C:
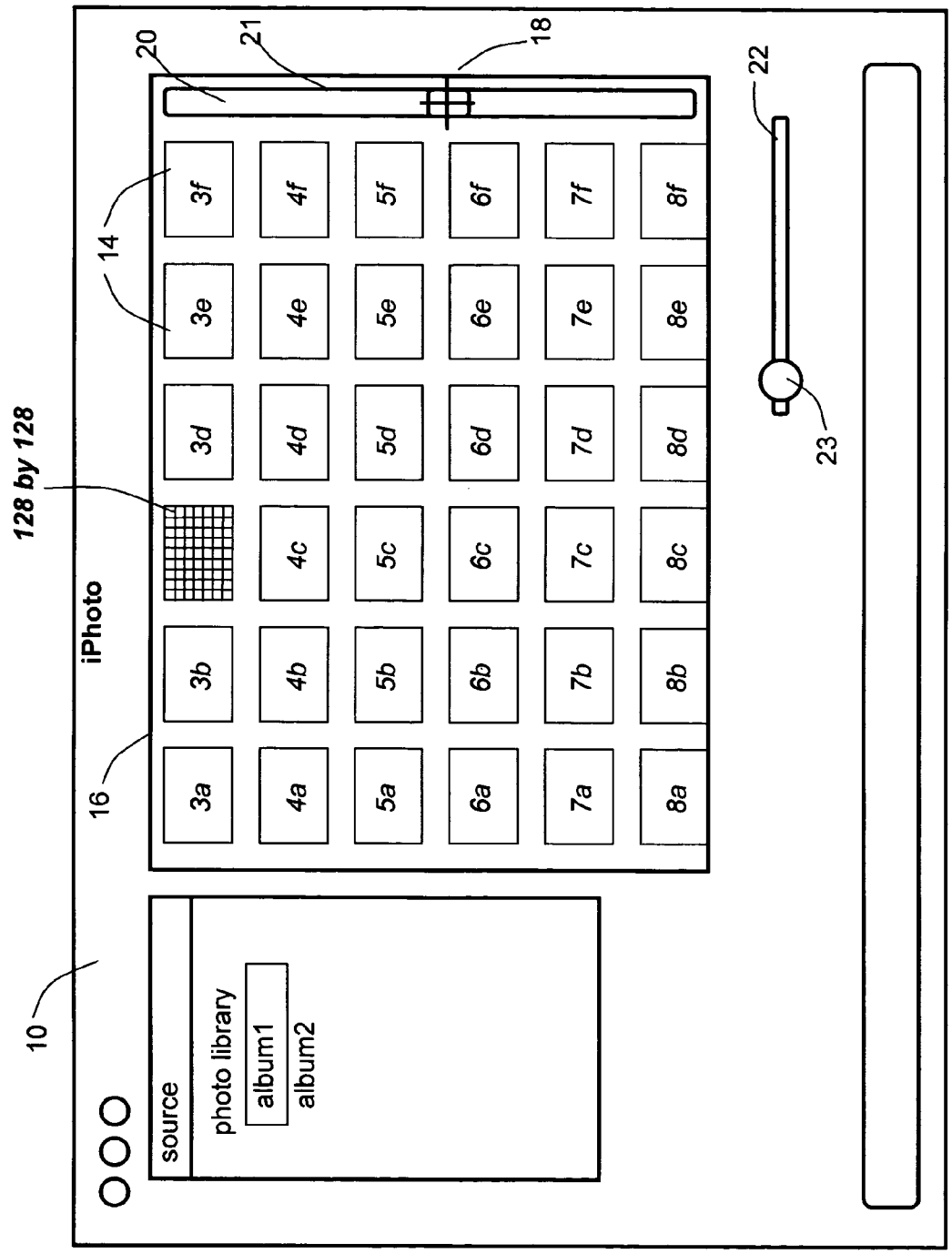

When the user stops moving the scroll bar 20 (FIG. 3c), and high bandwidth processing of the graphics is complete, the computer can query the database 30 to display the image previews 14 to their starting resolution, e.g., 128 by 128. Note again the relative pixel density in image preview 3c compared to FIGS. 3A and 3B.

In short, using this technique, the image previews 14 can appear at a suitably high resolution when the images previews are not being scrolled, and are reduced in resolution when being scrolled to save bandwidth. Of course, as a result, the image previews 14 will not look as sharp when scrolling due to their lower resolution, but this is noted to be generally satisfactory to the user who can't otherwise see moving images well in any event. Importantly, by reducing the resolution while scrolling, processing bandwidth is relieved (e.g., by a factor of approximately four for a 128 by 128 to 64 by 64 reduction). This mitigates problems noted in the prior art and discussed earlier, as the image previews 14 are more smoothly processed and displayed, and thus are less prone to hanging and flickering.

The technique can be modified in other beneficial ways. For example, the displayed resolution of the image previews 14 may becomes less important to the user the more quickly the uses scrolls through the image preview. Accordingly, the computer can monitor the speed at which scrolling occurs, and depending on that speed might choose to even further reduce the displayed representation of the image previews. For example, if the user scrolls above a certain threshold speed (e.g., 5 rows of image previews a second), the computer can query the database 30 to cause a 32 by 32 representation of the image previews to be displayed, i.e., two reductions in resolution from the starting resolution, and this representation can return to 64 by 64 when the scrolling speed at some later point again falls below this threshold, and then ultimately to the starting resolution of 128 by 128 when scrolling stops.

Figure 4A:
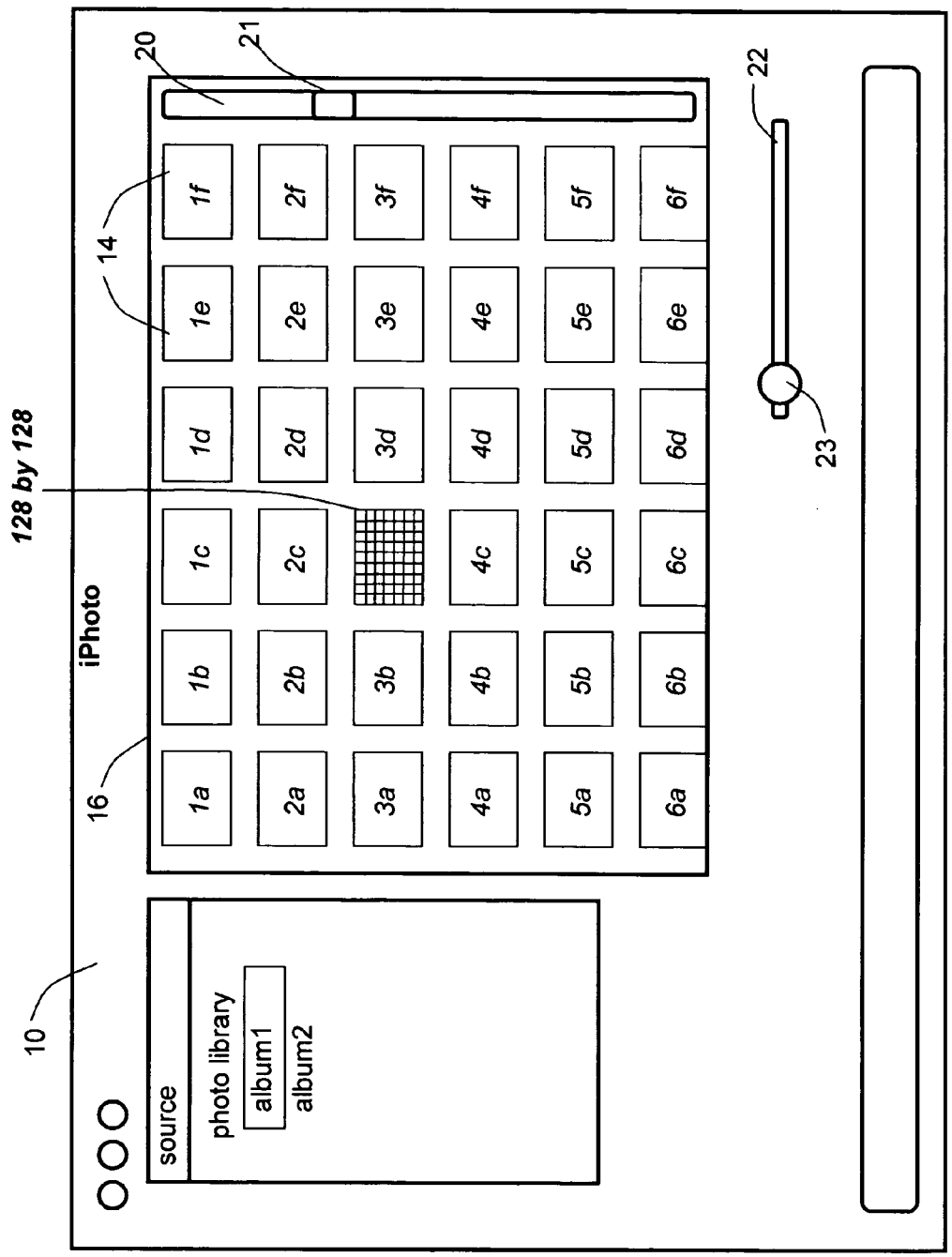
FIGS. 4A and 4B illustrates the GUI employing the database of FIG. 2, and shows changing the magnification of the image previews concurrent with the use of image preview data sets of differing resolutions.
Figure 4B:
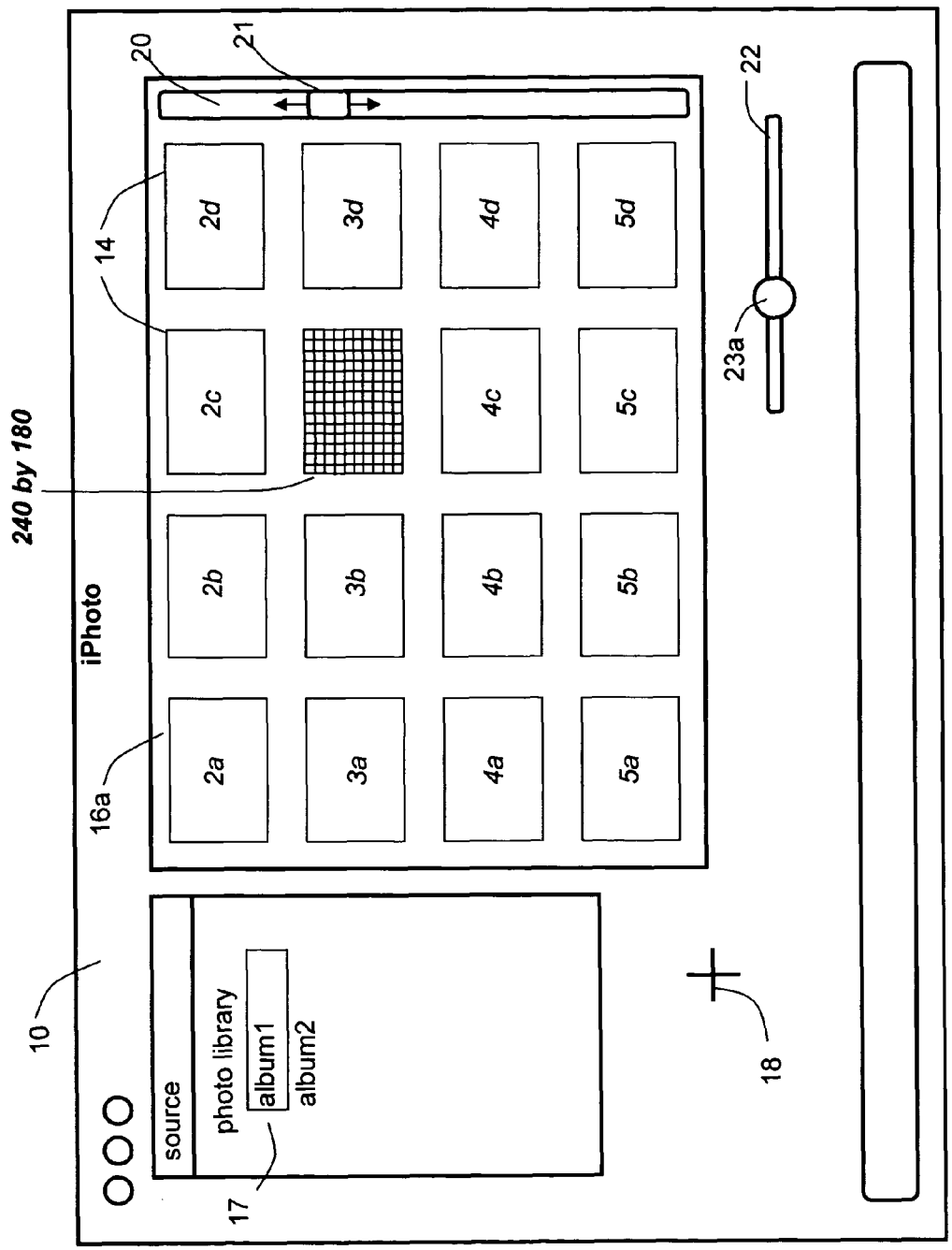

Pre-processing of the master images to provide image preview data sets 32 of differing resolutions has other benefits in addition to improved ease of scrolling; it can also benefit magnification or "zooming" of the images as well. For example, in FIG. 4A, we see FIG. 3A duplicated, in which the user is viewing certain image previews 14 at some standard resolution (e.g., 128 by 128). Should the user zoom to an increased magnification using zoom selector slide 22 (FIG. 3B), a higher resolution image preview data set 32 for the displayed image preview 14 (or simply the next highest resolution, e.g., 240 by 180) can be queried from the database 30 for display. This is again illustrated with respect to image preview 3c, which shows increasing number of pixels as the magnification is increased. In short, in comparison to the prior art, a single image preview 14 (240 by 180) need not be processed and rescaled as the zoom changes to draw that image preview in a larger area. Instead, as the zoom level is increased or decreased, increasingly higher or lower resolution image preview data sets 32 can be queried from the database for display, saving processing bandwidth.

Figure 5A:
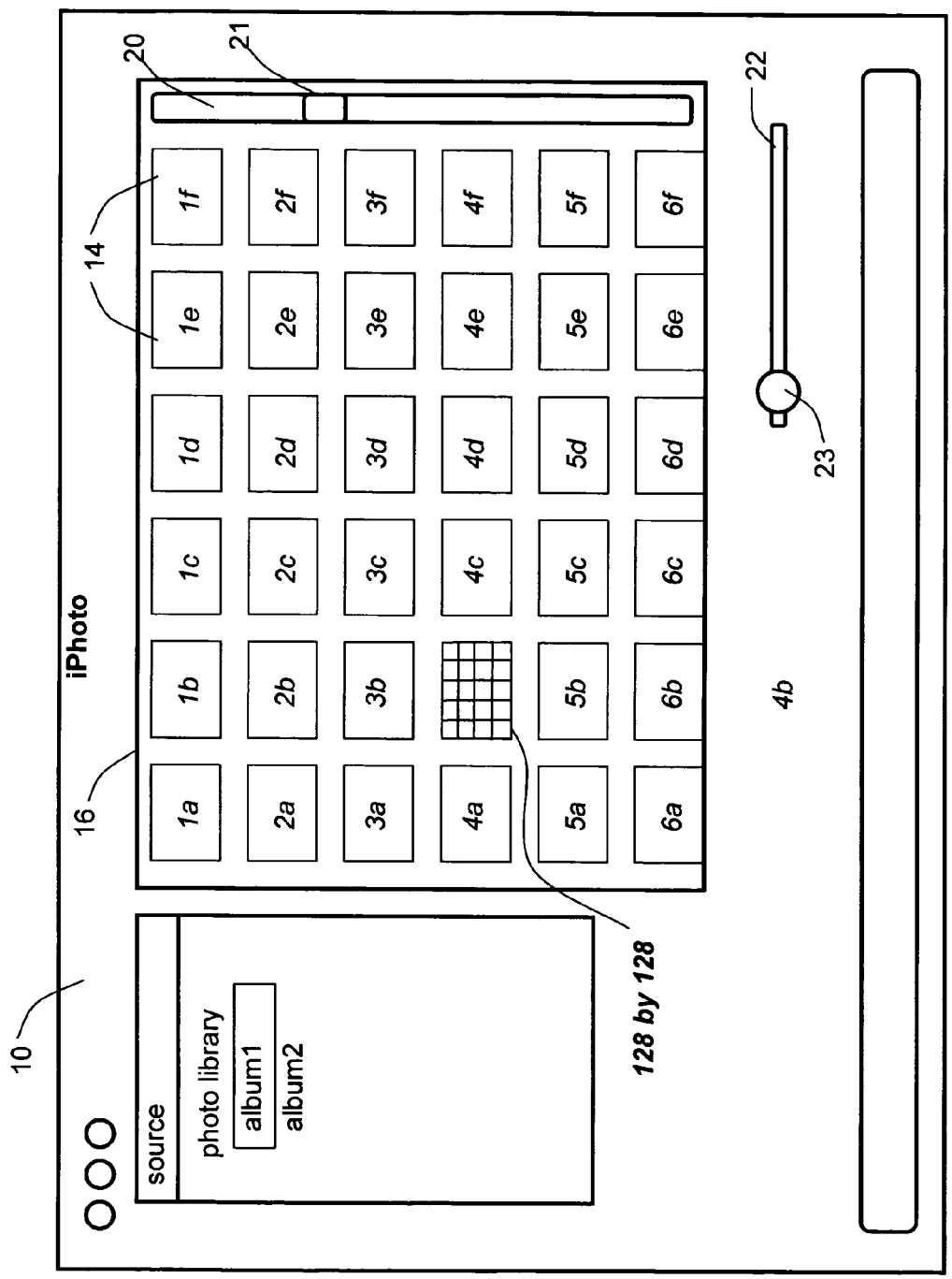
FIGS. 5A-5C are similar to FIGS. 4A-4B but show upscaling of the image preview data sets provide more magnification levels than the number of image preview data sets.
Figure 5B:
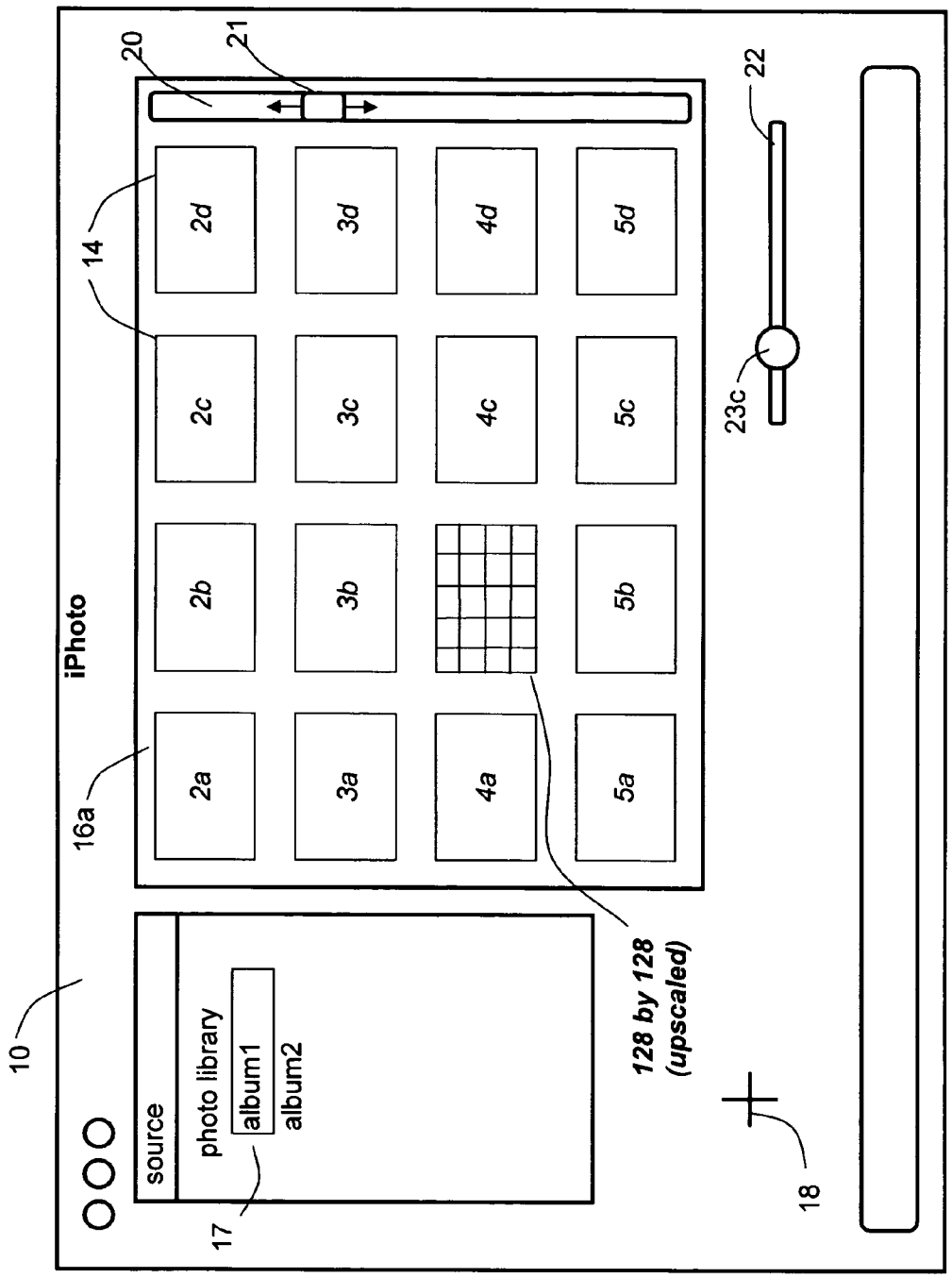
Figure 5C:
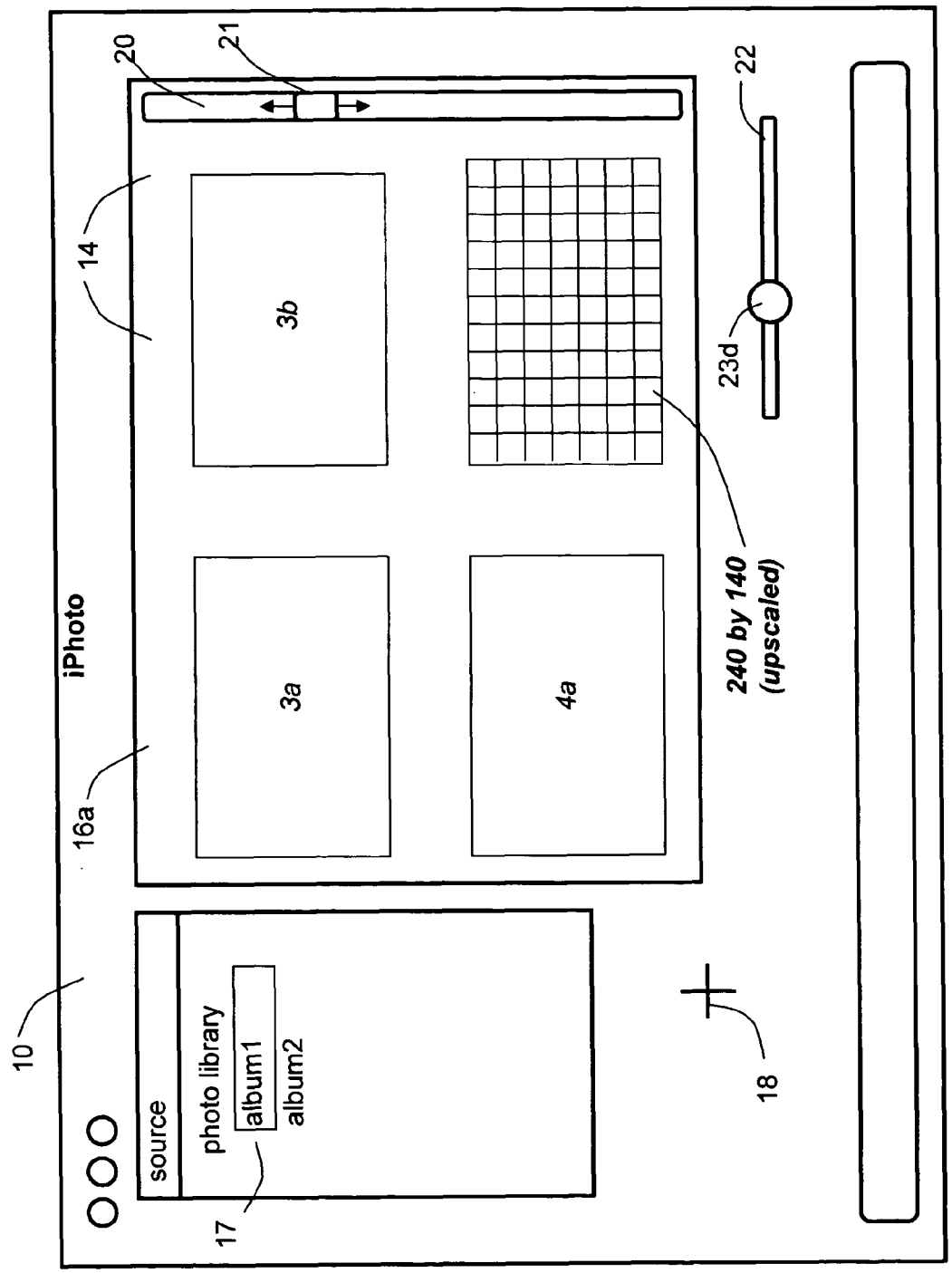

However, there need not be a one-to-one correspondence of image preview data sets 32 in the database 30 with displayed zoom levels. For example, assume the displayed resolution of the image previews 14 pulled from the database 30 in FIG. 5A is 128 by 128. As the magnification is increased using the zoom selector slide 22, the 128 by 128 image preview data set can be upscaled to increase the size of the image previews as the button 23 slides from left to right (FIG. 5B) (or downscaled if demagnifying). Eventually, it may not be advisable to further upscale the 128 by 128 data set as the displayed resolution of the image preview may become intolerable. Thus, at some discrete point along the button 23's travel, the database 30 can be queried to pull up the next highest resolution image preview data set (e.g., 240 by 180) (FIG. 5C). In short, there can be a greater number of displayed magnification levels than there are image preview data sets 32 stored in the database 30. This provides the user further granularity in the magnification levels that can be displayed, while potentially reducing the number of files (resolution) that must be stored in the database 30 for each master image. While upscaling the image data set requires additional computational power, the processing needed is lessen compared with the need to upscale (or downscale) the single image preview of the prior art when the magnification of the image previews 14 are changed.

While the disclosed techniques are particularly useful in the context of viewing and displaying numerous image previews 14, it should be noted that the techniques have utility when applied to master image files, or even a single master image. Consider scrolling within or changing the magnification of a single master image. In might be advantageous in a given application to change the displayed resolution of the image when scrolling within that image to reduce computational bandwidth. Accordingly, the displayed resolution of the image can be reduced while scrolling, and perhaps even further reduced when scrolling quickly in conjunction with the techniques disclosed earlier. Similarly, changing the magnification of an image might be benefited in a given application by displaying different resolutions of the image depending on the magnification level (with high resolution used for higher magnification), rather than scaling the displayed image. In short, the disclosed techniques have applicability to more than just that application—dynamic processing of image previews—that the disclosed techniques intended to solve.

While it is preferred in a commercial embodiment to pre-process the images as they are loaded in to or otherwise associated with the application program (iPhoto™) in which the image previews are viewed, this is not strictly necessary. For example, the images can be pre-processed and the database of image preview data sets populated by a program or routine (perhaps the computer's operating system) distinct from the application program in which the image previews would be viewed. The application program could then simply reference the database of stored image preview data sets as needed, or the database could later be moved to the application program for its use after pre-processing and population. This modification would be particularly useful, for example, for application programs running on platforms lacking suitable computing power to efficiently perform database pre-processing and population. For example, a Personal Data Assistant (PDA) might significantly benefit from the ability to access a database of image preview data sets. However, to save the PDA (or its operating system) the trouble of having to pre-process the images, the previously pre-processed and stored image preview data sets may merely be accessed by the PDA, or moved or transferred to the PDA for access.

Once the functional aspects of the disclosed techniques are known as disclosed herein, the programming such functionality is a routine matter, and is accomplishable using many different programming languages and within the context of many different operating systems. Accordingly, such coding specifics are not disclosed herein. Of course, ultimately the techniques disclosed herein would be coded into compute code and stored on a computer-readable media, such as a compact disk, a tape, a volatile or non-volatile memory such as an integrated circuit, etc. While envisioned are preferably running on a traditional desktop computer or workstation, it should be appreciated that the disclosed techniques can be utilized with other types of electronic computing devices, including but not limited to laptop/portable computers, PDAs, cell phones, iPods™, etc., all of which should be understood as "computers" for purposes of this disclosure.

The foregoing description of preferred and other embodiments are not intended to limit or restrict the scope or applicability of the inventive concepts contained herein. It is intended that the inventive concepts contained herein include all modifications and alterations to the full extent that they come within the scope of the following claims or equivalents thereof.

What is claimed is:

1. A method for altering a display representation of at least one image in an application program in a computer based on a manipulation of the display representation, the application program having a graphical user interface, the method comprising:

storing a master image and a corresponding plurality of image previews in persistent storage of a computer system, the plurality of image previews comprising a first image preview in a first data format, a second image preview in a second data format, and a third image preview, wherein the first image preview is of a different pixel resolution and data format than the second image preview, the third image preview is of a different pixel resolution than the first or second image preview, and wherein an image preview comprises a graphical representation of the master image;

using the stored first image preview to display a representation of the at least one image in the graphical user interface;

manipulating the representation of the at least one displayed image using the graphical user interface;

determining characteristics of the manipulation of the representation;

determining which of the second image preview or the third image preview represent a more efficient preview to use based on the characteristics of the manipulation of the representation of the at least one displayed image; and selecting the second image preview or the third image preview based on the determination, and while manipulating the representation of the at least one displayed image, using at least the selected image preview to display the representation of the at least one displayed image in the graphical user interface responsive to the manipulation.

2. The method of claim 1, wherein the pixel resolution of the first image preview is higher than the pixel resolution of the second image preview.

3. The method of claim 1, wherein the pixel resolution of the determined image preview used to display a representation is determined in accordance with a magnification manipulation of the at least one image.

4. The method of claim 1, wherein manipulating the representation of the at least one displayed image comprises displaying and moving the representation of the at least one displayed image responsive to the manipulation smoothly and continuously.

5. The method of claim 1, wherein the act of manipulating comprises scrolling.

6. The method of claim 1, wherein the at least one displayed image is manipulated by a user interfacing with the graphical user interface.

7. The method of claim 1, wherein at least one of the first or second image preview's data format is in a memory mapped format.

8. The method of claim 1, wherein at least one of the first or second image preview's data format is uncompressed.

9. The method of claim 1, further comprising, prior to storing the first or second image previews, processing the at least one image to form the image previews.

10. The method of claim 9, wherein processing occurs when the at least one image is associated with an application program.

11. The method of claim 1, wherein the stored image previews are transferred to an application program.

12. The method of claim 1, wherein at least one of the first and second image previews comprises a full resolution version of the at least one image.

13. A computer-readable medium containing computer readable instructions stored thereon for causing an electronic computing device to perform the method of claim 1.

14. The method of claim 1, wherein the pixel resolution of the second image preview used to display a representation is determined in accordance with a manipulation affecting magnification of a currently displayed representation of the at least one image.

15. The method of claim 1, wherein the pixel resolution of the second or third image preview is higher than the pixel resolution of the first image preview.

16. The method of claim 15, wherein the pixel resolution of the second or third image preview used to display a representation is determined in accordance with a magnification manipulation of the at least one image.

17. A method for displaying a representation of each of a plurality of master images in an application program in a computer having a graphical user interface, comprising:

storing, in persistent storage of a computer system, at least three or more image preview data sets for each of a plurality of master images, wherein the image preview data sets are all of differing pixel resolutions and wherein an image preview comprises a pixel based representation of its corresponding master image;

using a first of the image preview data sets to display a preview representation of at least a portion of the plurality of master images in the graphical user interface; and moving the preview representation of displayed images using the graphical user interface, and while moving the preview representation of displayed images, selecting a second of the image preview data sets from the at least three or more image preview data sets to display a second preview representation of corresponding images in the graphical user interface responsive to the act of moving and responsive to characteristics of the act of moving, wherein the second of the image preview data sets is in a data format different than the data format of the first of the image preview data sets and wherein the second of the image preview data sets comprises a more efficient data format for display responsive to the act of moving than the data format of the first of the image preview data sets.

18. The method of claim 17, wherein the pixel resolution of an image in the first image preview data set is higher than a corresponding images' pixel resolution in the second image preview data set.

19. The method of claim 17, wherein the pixel resolution of the first image preview data set is determined in accordance with a magnification of the displayed portion of the plurality of images.

20. The method of claim 17, wherein moving the preview representation of displayed images comprises displaying and moving displayed images from the preview representation responsive to the act of moving smoothly and continuously.

21. The method of claim 17, wherein moving the preview representation of displayed images comprises scrolling.

22. The method of claim 17, wherein the act of moving comprises a user interfacing with the graphical user interface.

23. The method of claim 17, wherein the data format of at least one of the image preview data sets for each of the plurality of images is in a memory mapped format.

24. The method of claim 17, wherein the data format of at least one of the image preview data sets for each of the plurality of images is uncompressed.

25. The method of claim 17, further comprising, prior to storing the image preview data sets, processing the plurality of images to form the image preview data sets for each of the plurality of images.

26. The method of claim 25, wherein processing occurs when the plurality of images are associated with an application program.

27. The method of claim 17, wherein the stored image preview data sets are transferred to an application program.

28. The method of claim 17, wherein the selected second image preview data set depends on a speed at which the preview representation of displayed images is moved.

29. The method of claim 17, wherein at least one of the image preview data sets comprises a full resolution version of the image.

30. A computer-readable medium containing computer readable instructions stored thereon for causing an electronic computing device to perform the method of claim 17.

31. The method of claim 17, wherein the pixel resolution of an image in the second image preview data set is higher than a corresponding images' pixel resolution in the first image preview data set.

32. The method of claim 17, wherein the pixel resolution of the second image preview data set is determined in accordance with a magnification of the displayed portion of the plurality of images.

33. A method for processing at least one image for eventual display in an application program accessible by a graphical user interface, comprising:

associating the at least one image with a first program; and upon associating the at least one image, automatically processing the at least one image to form and store, in persistent storage of a computer system, three or more image preview data sets for each at least one image, wherein the image preview data sets for each at least one image represent differing pixel resolutions of the at least one image and wherein an image preview comprises a representation of its corresponding image;

using a first of the image preview data sets to display a preview representation of the at least one image in the graphical user interface; and moving the preview representation of the displayed image using the graphical user interface in response to a user using the graphical user interface to select the preview representation itself, and while moving the preview representation of displayed image, using a second of the image preview data sets selected from the three or more image preview data sets to display a second preview representation of at least one image in the graphical user interface responsive to the act of moving the displayed preview representation itself and responsive to characteristics of the act of moving, wherein the second of the image preview data sets is in a data format different than the data format of the first image preview data set.

34. The method of claim 33, wherein the data format of at least one of the image preview data sets for each at least one image is in a memory mapped format.

35. The method of claim 33, wherein the data format of at least one and less than all of the image preview data sets for each at least one image are in a memory mapped format.

36. The method of claim 33, wherein the data format of at least one of the image preview data sets for each at least one image is uncompressed.

37. The method of claim 33, wherein the data format of at least one and less than all of the image preview data sets for each at least one image are uncompressed.

38. The method of claim 33, wherein the at least one image is associated when loaded into the application program.

39. The method of claim 33, wherein at least one of the image preview data sets for each at least one image comprises a full resolution version of the at least one image.

40. The method of claim 33, wherein the first program comprises the application program.

41. A computer-readable medium containing computer readable instructions stored thereon for causing an electronic computing device to perform the method of claim 33.

42. The method of claim 33, wherein moving the preview representation of the displayed image using the graphical user interface in response to a user using the graphical user interface to select the preview representation itself comprises a user dragging the preview representation of the displayed image.

* * * * *